No. 883,107. PATENTED MAR. 24, 1908.
F. GEHRICKE.
DERAILMENT GUARD.
APPLICATION FILED SEPT. 7, 1906.
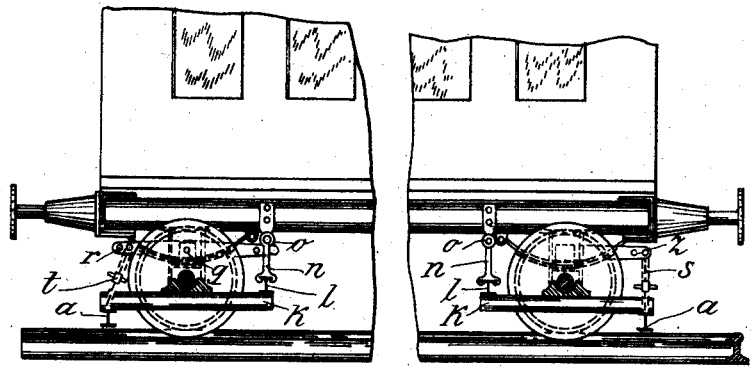
*Fig.1.*  *Fig.4.*
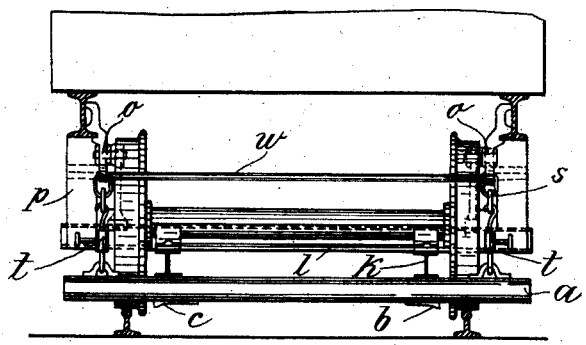
*Fig.2.*
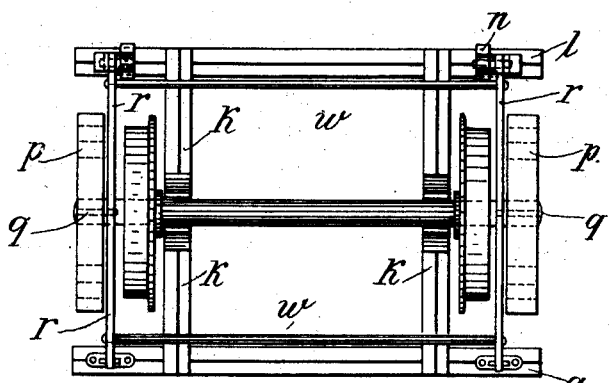
*Fig.3.*
Witnesses:
N. Reynolds
M. Taylor.
Inventor:
Friedrich Gehricke
by Georgii Massie
his attorneys

UNITED STATES PATENT OFFICE.

FRIEDRICH GEHRICKE, OF BERLIN, GERMANY, ASSIGNOR OF ONE-HALF TO FRIEDRICH BOLLMANN, OF BERLIN, GERMANY.

DERAILMENT-GUARD.

No. 883,107.    Specification of Letters Patent.    Patented March 24, 1908.

Application filed September 7, 1906. Serial No. 333,626.

*To all whom it may concern:*

Be it known that I, FRIEDRICH GEHRICKE, citizen of Germany, residing at Berlin, 114 Ritterstrasse, Germany, have invented certain new and useful Improvements in Derailment-Guards; and I do hereby declare the following to be a full, clear, and exact description of the invention, such as will enable others skilled in the art to which it appertains to make and use the same.

This invention relates to appliances for supporting railway vehicles on the rails when the wheels are derailed and comprising a transverse bar or rail adapted to come in contact with and slide along the track rails when the wheels leave the rails.

According to this invention the transverse slide rail is normally held above the track rails out of contact therewith by rods pivoted to the frame of the vehicle in such manner that it can swing about the pivots and is also connected with the vehicle by adjusting rods by which means it can be supported in a higher or lower position relatively to the track.

If the rods which regulate the height of the bar or rail are directly connected with the frame of the vehicle the bar must be variously adjusted with respect to its distance from the track, because the slide or skidding bar is intended to lie at all times as closely as possible above the track, the vehicle however altering the distance of the bar, according to the extent to which it is loaded, for the more heavily the vehicle is loaded the more will the body of the vehicle and therewith also the slide bar be lowered, and vice versa, so that the rods which regulate the height of the slide bar must be correspondingly shortened or lengthened. The adjustment every time of the slide bar with respect to its distance from the track is however superfluous, when in consequence of the special nature of their suspension, the rods which regulate that distance are no longer affected by the alteration in the load of the vehicle. For this purpose these rods may, for example, be connected with one end of a lever suspended in the manner of the beam of a vehicle to the axle, so that the free end of the lever is pressed upwards against the frame of the vehicle. Consequently when the load is increased, this free end is lowered with the frame of the vehicle the other end, however, and therewith the slide bar being pulled upwards. By specially determined measurement of the lever arms this movement of the slide bar, which is dependent on the change in the load of the vehicle, can of course be reduced to a practically inappreciable minimum, so that the slide bar is practically always at the same distance from the track. Or the rods which regulate the height of the slide bar may be connected with a lever fixed to the axle, and which—as the axle and consequently also this lever is not affected by the change in the loading of the vehicle— holds the slide bar at all times at the same distance from the track, whatever the load of the vehicle may be.

In the accompanying drawing two forms of the invention are illustrated Figure 1 being a side elevation of a part of a vehicle fitted with an appliance in accordance with this invention. Fig. 2 is a front elevation of the same. Fig. 3 a plan, the body of the vehicle being removed. Fig. 4 illustrates the manner in which the slide bar is always firmly held at the same height above the track by a lever firmly arranged on the axle box.

The slide bar $a$ is furnished with the downwardly directed projections $b$ and $c$ and fixed to the beams $k$. The projections $b$ $c$ prevent the carriage from running entirely off the rails. The beams $k$ are held together by the connecting bar $l$, which is firmly held by the oscillating links $n$. Finally the links $n$ are pivoted on the pins $o$, which are secured to the frame of the vehicle by a clip or the like. The slide bar $a$ can thus swing up and down easily and be adjusted to any desired height above the track. In order that this adjustment may be made independent of the alteration in the load of the vehicle which frequently occurs I support on the axle $p$ a pivot bolt $q$ on which a double arm lever $r$ can easily turn. To the one end of this lever the chains $s$ which hold the slide bar up are fixed, so that the free end of the lever $r$ is drawn up and pressed against the pin $o$. When the load of the vehicle is increased, the frame or body of the vehicle is lowered, and therewith the pin $o$ and also the free end of the lever $r$, while the other end raises the slide rail $a$. The levers $r$ are connected together by means of the transverse rods $w$, in order that they may not move sidewise. The nearer the pivot $q$ of the lever $r$ the chain $s$ is suspended the less is the movement which is effected by the slide bar $a$ in consequence of the alteration of the load of the vehicle. However, the increased loading of the vehicle cannot cause the slide bar $a$ to slide on the track, as it is removed farther from the track as the load is increased.

The oblique suspension of the chain $s$ on the beam $r$ can be prevented by placing on the carriage frame—in Fig. 1 above the place of connection between the chain $s$ and lever $r$—a second pivot pin and on this a second beam like lever. The chain $s$ must be fixed to this second lever exactly above the safety bar $a$, shortly in front of its pivot, and the other and considerably longer end of the lever be linked to the lever $r$ shortly in front of its pivot $q$. The movement of the lever $r$ arising from the load of the vehicle is then transmitted in a very slight degree to the beam like lever, and this small movement is communicated in a still further reduced degree to the chain $s$ and the slide rail $a$, the last named practically having no movement at all.

By means of the device illustrated in Fig. 4 the adjustment of the height of the slide bar independently of the continuous slight alterations in the load of the vehicle can be effected more simply than with such beam like levers. To the axle the one arm lever $z$ is fixed and to the free end of this the slide rail $a$ with the assistance of chains $s$ or the like. As the axle does not follow the change in the load of the vehicle, the slide bar always remains adjusted at the same height above the track.

It is of no essential importance as regards the invention how the levers $r$ and $z$ are constructed. The chains $s$ can of course be lengthened or shortened at any time by means of the sleeve nut $t$ or the like.

Having thus fully described my invention, what I claim is:—

1. In a derailment guard for railway vehicles, the combination of a slide bar, means to oscillatingly support said slide bar on the vehicle, and means to adjust its distance from the track.

2. In a derailment guard for railway vehicles, the combination of a slide bar, means to oscillatingly support said slide bar on the vehicle, rods regulating the distance of the guard from the track, and means to connect said rods to a part of the vehicle not affected by the change of the load.

3. In a derailment guard for railway vehicles, the combination of a slide bar, means to oscillatingly support said slide bar on the vehicle, a bearing, a lever, means to connect one end of said lever to the rods carrying the guard, the free end of the lever pressing against the frame of the vehicle, and means to lower the free end and raise the opposite end of the lever to which the guard is suspended by the load of the vehicle.

4. In a derailment guard for railway vehicles, the combination of a slide bar, means to oscillatingly support said slide bar on the vehicle, a bearing, a pivoted lever, and means to suspend the guard nearer to the pivot of the lever than the distance between the said pivot and the one of the frames of the vehicle.

5. In a derailment guard for railway vehicles, the combination of a slide bar, means to oscillatingly support said slide bar on the vehicle, a bearing, a double armed lever, a second horizontally placed lever, means to connect the same with the shorter arm of the double armed lever, means to suspend the slide bar on the shorter arm of said second lever, and means to connect its longer arm with the shorter one of the double armed lever, said means being adapted to reduce to a minimum the influence of the changes in the load of the vehicle.

6. In a derailment guard for railway vehicles, the combination of a slide bar, means to oscillatingly mount said slide bar on the vehicle, an arm fixed to the bearing provided for the wheels of the vehicle or the like, and means to connect the slide bar with the free end of said fixed arm.

In testimony whereof I hereunto affix my signature in the presence of two witnesses.

FRIEDRICH GEHRICKE.

Witnesses:
   WOLDEMAR HAUPT,
   HENRY HASPER.